United States Patent [19]

Falk

[11] Patent Number: 4,888,713

[45] Date of Patent: Dec. 19, 1989

[54] SURFACE DETAIL MAPPING SYSTEM

[75] Inventor: Edward K. Falk, Grand Rapids, Mich.

[73] Assignee: CDI Technologies, Inc., Grand Rapids, Mich.

[21] Appl. No.: 904,682

[22] Filed: Sep. 5, 1986

[51] Int. Cl.$^4$ .................................................. G06F 3/14
[52] U.S. Cl. .................................... 364/522; 340/723; 340/729; 364/521
[58] Field of Search ............................... 364/518–522; 340/703, 747, 721, 723, 724

[56] References Cited

U.S. PATENT DOCUMENTS

| 3,534,396 | 10/1970 | Hart et al. | 364/474 |
| 3,614,410 | 10/1971 | Bailey et al. | 364/520 |
| 3,636,328 | 1/1972 | Korelitz et al. | 364/512 |
| 3,653,071 | 3/1972 | Hill et al. | 364/300 |
| 3,693,168 | 9/1972 | Halkyard et al. | 364/900 |
| 3,716,705 | 2/1973 | Newell | 364/518 |
| 3,732,557 | 5/1973 | Evans et al. | 340/710 |
| 4,058,849 | 11/1977 | Fitzgerald et al. | 364/520 |
| 4,070,710 | 1/1978 | Sukonick | 364/900 |
| 4,546,434 | 10/1985 | Gioello | 364/300 |
| 4,685,070 | 8/1987 | Flinchbaugh | 364/522 |
| 4,703,426 | 10/1987 | Flinchbaugh | 364/421 |
| 4,719,585 | 1/1988 | Cline et al. | 364/518 |

OTHER PUBLICATIONS

*Procedural Elements for Computer Graphics* by David F. Rogers, pp. 354–362, (McGraw-Hill 1985) (excerpt).
"Texture and Reflection in Computer Generated Images" by James F. Blinn and Martin E. Newell, pp. 542–547, Communications of the ACM, (Oct. 1976).
"Simulation of Wrinkled Surfaces" by James F. Blinn, Computer Graphics, vol. 12, Proceedings of SIGGRAPH (1978) pp. 286–292.
"Mapping Methods for Generating Three-Dimensional Meshes" by W. A. Cook and W. R. Oakes, pp. 67–72, Computers in Mechanical Engineering, (Aug. 1982).

*Primary Examiner*—David L. Clark
*Assistant Examiner*—H. R. Herndon
*Attorney, Agent, or Firm*—Cox & Smith

[57] ABSTRACT

A system and method for providing surface detail to computer generated two-dimensional graphic images of apparel or other free-form surfaces such that the three-dimensional appearance of the image is provided or enhanced. That is accomplished through a combination of user-controlled mesh generation for providing the topology of the image "surface" and a texture-mapping technique for applying the surface detail once the mesh has been generated. The system and method of the present invention may be used as one function of a larger two-dimensional computer aided design system for apparel, footwear, textiles, interior design, or other applications where the user may wish to add surface detail to a two-dimensional computer image of a three-dimensional object or surface.

27 Claims, 10 Drawing Sheets

SURFACE DETAIL MAPPING SYSTEM

BACKGROUND OF THE INVENTION

1. Field of the Invention

The invention is in the field of computer aided design ("CAD") systems, and specifically relates to a system and method for providing texture mapping to a two-dimensional design system.

The present invention has specific application to the apparel and footwear design industries.

2. Background Description

In the field of computer aided design, one of the objectives of any CAD system is to display a realistic image of whatever is being designed on the graphic visual input/output device, e.g. cathode ray terminal ("CRT"), of the system. One technique for enhancing the realism of the generated image is to add detail to the surfaces or areas making up the image using a texture mapping technique. That has been employed in three-dimensional CAD systems, notably those used in making animated films. The objects designed on and displayed by such systems are represented internally by a data structure that reflects the three-dimensional topology of the object. The texture mapping algorithms incorporated into those systems use that topology as a guide for applying the texture over the surface of the object in a realistic manner. *Procedural Elements for Computer Graphics* by David Rogers, pp. 354–363 (McGraw-Hill 1985); "Texture and Reflection Computer Generated Images" by James F. Blinn and Martin E. Newell, pp. 542–547, *Communications of the ACM*, (Oct. 1976); "Simulation of Wrinkled Surfaces" by James F. Blinn, Computer Graphics, Vol. 12, *Proceedings of SIGGRAPH* (1978) pp. 286–292. In order to obtain that realism, the texture applied to any surface of the object that is not perpendicular to the viewing direction (line of sight) must show distortion to give the appearance of being "tipped away" from the viewer; the applied texture should be shaded the same as the object based on a light source at a given location; the texture should appear larger near the front of the object and smaller near the back due to perspective; and, the texture should not appear if it is mapped to a surface that is on the back of the object. Those are a few of the visual cues that a texture-mapping algorithm used in a three-dimensional CAD system can give a user to enhance the three-dimensional appearance of the object being designed.

Those systems, however, are complicated and require comparatively large, expensive computer systems. Moreover, there is a need to be able to provide texturing which would provide for a three-dimensional appearance for two-dimensional CAD systems.

In the case of a two-dimensional CAD system, the image on the graphic visual input/output device, i.e. CRT, may have been drawn freehand by the user or may be a digital photograph that was input via a video camera. In any case, the data structure describing the three-dimensional topology of the object or image being designed does not usually exist in a two-dimensional CAD system; hence there is no well-defined procedure by which surface detail may be "correctly" applied to the different parts of the image. That is the problem the present invention addresses.

SUMMARY OF THE INVENTION

Once an image has been displayed on the graphic input/output device or CRT of a two-dimensional CAD system, the present invention provides the user with a capability of creating perspective meshes that cover different parts of the image in such a way as to give the appearance of describing the three-dimensional topology of the underlying image. The user is given the "tools" for controlling how the perspective meshes cover the image; these are used for the initial placement of the mesh and subsequent adjustment of the mesh until the user feels that it adequately describes the shape of the underlying surface.

A "perspective mesh", as used herein, is a mesh created by a plurality of horizontal and vertical lines which form a number of quadrilaterals. The horizontal and vertical lines are spatially arranged such that the resulting image is a representation of a three-dimensional form, or, in short, represent the three-dimensional image as it might appear to the eye, but in two-dimensional form.

In the case of apparel design, the present invention gives the user, for the first time, the capability to place a mesh over a piece of material in such a way as to follow any curves in the shape, as well as follow the contours of any folds and wrinkles. If the image is of a room interior, meshes can be placed on curtains or furniture in the scene so that surface detail (in this case fabrics, patterns and so forth) can be applied to their surfaces in a realistic manner. A mesh can also be placed on a floor in a room in such a way as to show perspective, allowing different carpet patterns and color to be applied to the floor.

After meshes have been applied to the different parts of the image, the present invention permits the use of surface detail mapping to apply the surface detail to the parts of the image that are covered by the meshes. A surface detail mapping function in a three-dimensional CAD system uses the actual topology of the object being designed as a guide when applying the surface detail to the parts of the object. For the purpose of summarizing the present invention, a surface detail mapping method of the present invention uses the user-defined meshes which have been developed as described above.

In the apparel industry, the present invention now permits a designer to use a video camera or digitizing drafting tablet to enter an image of a model, for example, wearing a dress of a particular design into the computer of a two-dimension CAD system. That stored image can be retrieved to a CRT or other graphic visual input/output device which then presents a two-dimensional image of the model and the dress. In order to obtain a three-dimensional appearance, the designer, using the present invention, creates a perspective mesh overlaying the dress which now gives the designer the ability to represent, in two-dimensional form, the actual three-dimensional surface. The designer then retrieves various surface details (in this case, various cloth/materials having differing textures, weaves, patterns, colors, and the like) from computer storage and can easily "dress" the model on the CRT with those differing textures, weaves, patterns and the like until a final design is reached. The designer can then produce a hard-copy image of the resulting design.

In interior design, the present invention permits a designer to use a video camera, for example, and take a video image of an actual room and then, using the mesh generation and surface detail mapping techniques of the present invention, change the texture, pattern and colors of floor coverings (i.e. carpet), window treatments (i.e. drapes and the like), and other room features until a final design is reached. Rather than guessing how a particular carpet will look in a particular room, the design can now actually "lay" the carpet in the room using a CAD system and see how the carpet looks in a three-dimensional representation.

Thus, it is an object of the present invention to provide a system and method for providing surface detail to computer generated two-dimensional graphic images of apparel or other free-form surfaces and three-dimensional objects.

It is another object of the present invention to provide a user-controlled mesh generation system and method for producing a topology for a two-dimensional graphic image of a three-dimensional free-form surface or object.

It is a further object of the present invention to provide a system and apparatus for applying surface detail to a two-dimensional graphic image which gives the image a three-dimensional appearance.

It is yet a further object of the present invention to provide a simpler system and method for providing surface detail in CAD systems, and one requiring comparatively less expensive and complicated computer hardware and systems.

It is yet another object of the present invention to provide a system and method which permits a user to provide visual images of a variety of apparel or other designs illustrating differing surface textures, patterns and colors, which images give a three-dimensional appearance.

It is a still further object of the present invention to provide a system and method which allows a user to input to a two-dimensional graphic system the image of a room, apparel design, or other free-form three-dimensional surface and then vary, at the user's will, the surface texture, pattern and colors of selected portions of that image, for example floor and wall coverings, window treatments, apparel fabric and so forth.

These and other objects, features and advantages of the invention will become evident in light of the following detailed description, viewed in conjunction with the referenced drawings, of a preferred Texture Mapping System according to the invention. The foregoing and following description of the invention is for exemplary purposes only. The true spirit and scope of the invention is set forth in the appended claims.

DETAILED DESCRIPTION OF THE INVENTION

Figure 1:
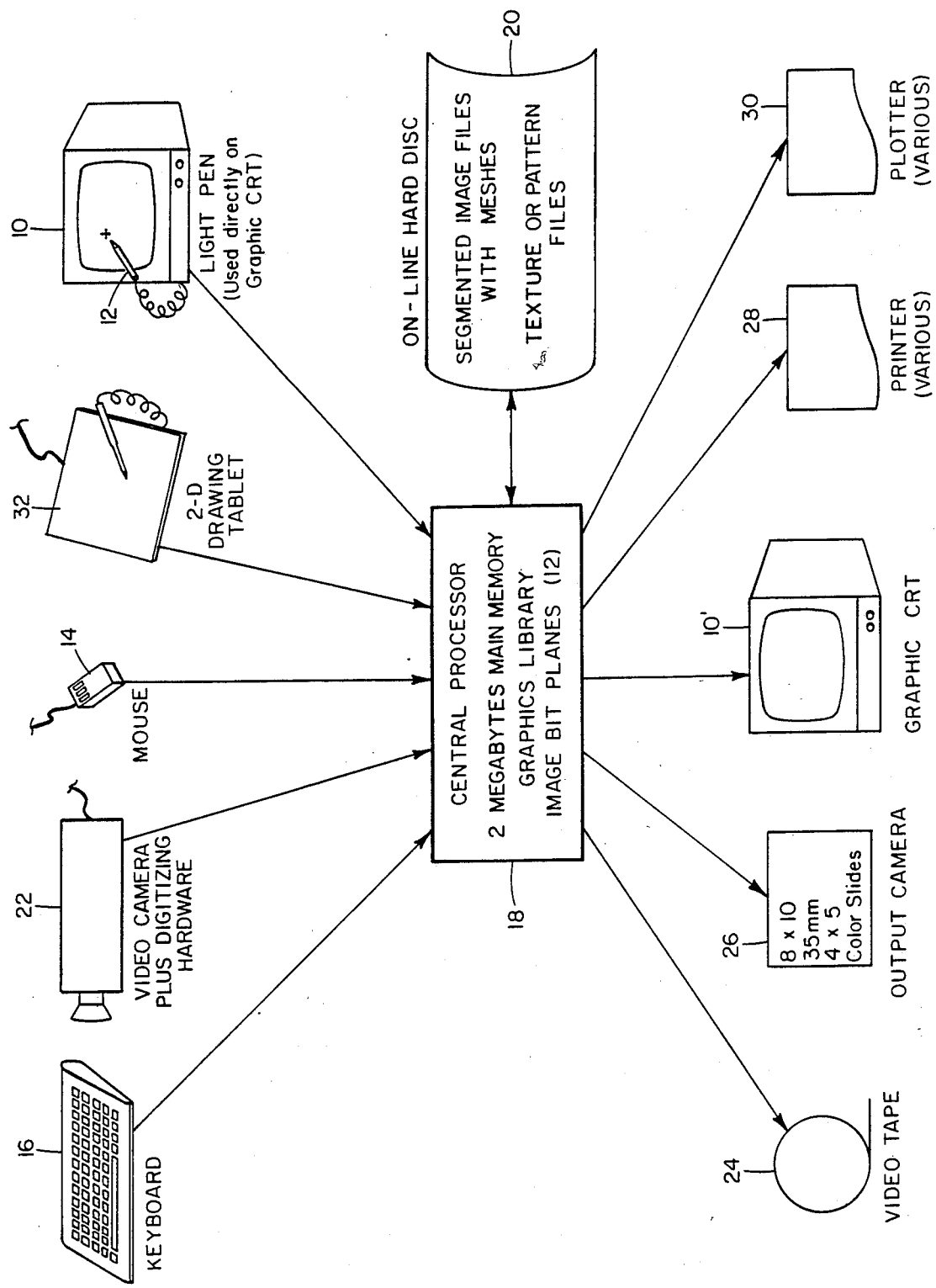
FIG. 1 is an illustration of a CAD hardware system useful in the present invention.

Although the current invention has particular application in the apparel industry and the following description focuses on that application, it should be understood that the invention may be applied in any instance involving a three-dimensional object.

For purposes of this description, there are a few assumptions made about the nature of the two-dimensional images that are displayed on standard graphic CRTs of CAD systems which are to be used as a backdrop for mesh generation and subsequent application of surface detail. The two-dimensional image being worked on should be realizable as a set of constituent parts that, though perhaps appearing to be a three-dimensional object, are simply the projection into two dimensions of the parts making up the object. The individual parts making up the object (in the case of apparel: sleeves, fronts, yokes, etc.) are then bounded by two-dimensional polygons, each of which contains a region of the image that consists of a single piece of material, and as a collection cover all pieces of material or parts making up the image. Those polygons are referred to as "segments" and may be applied to the image point by point via a manual digitizing process using a locating instrument such as a standard light pen or mouse. The two-dimensional image may have been input to the CAD system through a video camera or by being sketched in directly by the user. Once in the system, the image is stored on a data storage system, preferably a hard disk, for later retrieval. The definition of the segments digitized by the user to define the image parts are stored with the image.

After an image has been segmented, the user may then generate the meshes which will guide the texture mapping, with one mesh per segment. The segments used to subdivide the image will usually each cover one part or piece of material; the associated mesh that the user places on the segment will then determine how the surface detail will then be applied to that piece of material.

To define a mesh, the user first digitizes four bounding polylines, the 'top', 'left', 'bottom', and 'right'. This is done in a manner similar to that done in digitizing the boundary of the segment. In fact, it is often useful to use portions of the boundary of the segment as part of the polylines making up the mesh boundary. Once the boundary polylines of the mesh have been digitized, the user can repeatedly generate the mesh bounded by the polylines while making changes to the polylines using editing functions (for example, instructions to move polyline point, insert, delete and so forth) until the shape of the mesh looks like it fits correctly over the underlying surface. An editing function for adjusting the points singly inside the mesh may be used to make small adjustments in the appearance of the interior of the mesh. Another method for adjusting the interior of a generated mesh without changing the border or the mesh in the vicinity of the border is to actually digitize interior polylines, thus creating "sub-meshes" of the original mesh. Such technique gives the user a more general ability for controlling the interior shape of the mesh. The meshing algorithm is then applied recursively to create each of the sub-meshes, which as a whole make up the complete mesh. When the user is satisfied that the mesh is shaped correctly over the image surface under the segment, the user may then store the mesh with the associated segment.

Once a mesh has been created and stored with an image segment, the user may then apply surface detail to the segment using the texture mapping function of the present invention. The texture mapping function will then use the mesh associated with the segment as a guide for applying the surface detail to the portion of the image under the segment. The "surface detail", also known as "textures" or "patterns", may be digitized images brought into the system via video camera input, or they may have been designed using other facilities. Those facilities may be "paint" programs, fabric weaving programs, or patterning programs or some of the other functions in standard two-dimensional CAD systems. The textures or patterns (and images, for that matter) are stored on the data storage device, e.g. system hard disk, as a rectangular array of pixels.

Description of Hardware

The hardware requirements to support the present invention are basically those needed to support a standard two-dimensional CAD and image processing system. An illustration of such a system is given in FIG. 1. The hardware should consist of, minimally, a graphic visual input/output device, e.g. a CRT, 10 and 10', with a standard light pen 12 or mouse 14 as a locating instrument, a keyboard 16, a central processing unit 18 that will support program control of the individual pixels displayed on the graphic CRT 10 and 10' (through use of graphics command library), and a data storage unit 20, preferably a hard disk storage unit. If the images used in the system are to be inputted through a video input, a video camera 22 and standard associated frame-grabbing hardware (not shown) are also required. Input to the system may also be through a standard two-dimensional digitizing drawing device 32. The data storage unit 20 is needed for storage of the data files supporting the two-dimensional software system including the digital graphic images, segments and meshes thereon, and the textures, patterns, fabrics, etc., also stored as digital images for application as surface detail to the segments on the graphic images. For the mesh generation capability, the central processor should support floating-point mathematics computation. Another consideration is the number of simultaneously displayable colors possible on the graphic CRT 10 and 10' of the computer system; a minimum of 256 simultaneously displayable colors and preferably 4096 would be needed in a system with video camera input and colorization or texture mapping performed by the software. Adequate facilities for performing these functions are found in the "Engineering Workstations" currently available from several vendors such as Silicon Graphics Inc., Apollo Computer Inc., and SUN Microsystems.

The present invention is preferably used in conjunction with a Silicon Graphics Inc. IRIS workstation, currently configured with a keyboard, three-button mouse, graphic CRT with a viewable resolution of 768 by 1024 pixels, a central processor with 2 megabytes of main memory and supporting 4096 simultaneously displayable colors on a graphic CRT, and a 72 megabyte hard disk. Television input of images and textures are supported using a video camera and a video frame buffer. A system configured with greater viewable resolution, or more simultaneously displayable colors would permit even better visual results.

The output of the system can be directed in known manner to a video tape 24 for later viewing, an output camera 26 capable of producing color slides or photographs of various sizes, a graphic CRT 10' (which, of course, may be the same as the input graphic CRT 10), or to hardcopy for example through a printer 28, or a plotter 30.

Description of Software

In describing the functions of the present invention involved in applying surface detail to two-dimensional images such that the "three-dimensional appearance" is provided or enhanced, two groups of functions need to be detailed. The first is the set of functions used for defining, generating, editing, and storing a mesh. The second is the set of functions used for storing textures and patterns and applying them to the image. Since most current CAD systems are menu driven, the explanations given below will describe how the user would execute the functions by selecting from a menu displayed on the graphic CRT of the system.

Basic capability for creating and adjusting meshes can be provided in a menu with the following choices:
Top Polyline
Left Polyline
Bottom Polyline
Right Polyline
Generate Mesh
Modify Mesh Points
Store Mesh With Segment The functions "Top Polyline", "Left Polyline", "Bottom Polyline", and "Right Polyline" permit the user to digitize in x, y coordinates points of the polylines used to serve as the borders of the mesh. After selecting one of those functions, the user must digitize each of the points of the polyline using a locating instrument (such as a light pen 12 or mouse 14) until the polyline is completed. All four polylines are digitized in the same manner. A polyline may be re-digitized as many times as necessary until the user is satisfied with the shape.

When the user is satisfied with the shape of the four boundary polylines, the "Generate Mesh" choice may be selected from the menu to generate the interior mesh points based on the boundary polylines as contraints. If the shape of the mesh is not what the user wanted, some or all of the boundary polylines may be re-digitized and the mesh generation performed again. There are various mathematical techniques of generating a mesh given the constraints of four boundaries. Many of these have been described in technical journals of the mathematics and computer science communities for example. "Mapping Methods for Generating Three-Dimensional Meshes", *Computers in Mechanical Engineering* (Aug. 1982); "Body Oriented (Natural) Coordinator for Generating Three-Dimensional Meshes", *Int. J. Num. Meth. Engng.*, Vol. 8 pp. 27-43 (1974); and "Construction of Curvilinear Coordinate System and Application to Mesh Generation", *IDEM*, Vol. 7, pp. 461–477 (1973). One particularly useful variation in accordance with the present invention on the mesh generation techniques previously described is to incorporate perspective into the shape of the mesh. In short, creating a representation as it would appear to the eye. In the case of interior design, that is useful for the grid that is associated with the segment covering the floor in the image.

If a small change needs to be made to the interior of the mesh, the Modify Mesh Points function may be selected to allow the user to adjust the location of points lying within the generated mesh. After picking this function, the user may use the locating instrument (light pen 12 or mouse 14) to select the points to be moved, and the locations that they are moved to.

Once the user is satisfied that the shape of the mesh gives a good approximation to the surface lying beneath it, the mesh may then be stored with the associated segment by selecting the Store Mesh With Segment menu choice, followed by selecting the segment with the locating instrument. In the normal use of this function, it is understood that the boundary of the segment should lie entirely within the bounds of the generated mesh; if any part of the segment lies outside of the mesh, surface detail will not be able to be applied to that portion of the segment during the mapping.

More complete and flexible capability for adjusting the shape of the meshes may be achieved with the following choices in the mesh generation menu:

Move Polypoint
Insert Polypoint
Delete Polypoint
Horizontal Polyline
Vertical Polyline The functions "Move Polypoint", "Insert Polypoint", and "Delete Polypoint" are polyline editing functions that allow the user to change the shape of, add points to, and delete points from the polyline without having to re-digitize all of it.

The "Horizontal Polyline" and "Vertical Polyline" functions give the user an easier to use (and more general purpose) method of modifying the interior shape of the mesh than the Modify Mesh Points function. The "Top Polylines", "Left Polylines", "Bottom Polylines", and "Right Polylines" functions impose control over the shape of the mesh from the boundary. By having additional vertical and horizontal control lines that control the interior shape of the mesh, the mesh can be made to more easily fit over bumps, folds, or other irregularities in the interior of the piece of material being meshed. Those polylines must traverse the length or width of the mesh; the mesh generated is actually several separately generated meshes composited together, the meshing algorithm having been applied recursively to each of the small areas bounded by the border or interior polylines.

The basic functions for providing a mapping capability may be provided by a menu with the following choices:

Store Texture/Pattern
Apply Texture/Pattern

Assuming that there is some image displayed on the graphic CRT 10 or 10' of the system, the Store Texture/Pattern function will allow the user to store a portion of that image as a rectangular array of pixels in a file in data storage unit 20 for later application to a segmented image to provide surface detail. The definition of "pixel" in this context is the information required to define the color and intensity attributes of one elemental point on the graphic CRT, and as such will vary from system to system, depending on the number of available bit planes in the graphics frame buffer and other considerations.

The Apply Texture/Pattern function allows the user to apply the surface detail to a segment with an associated mesh. Once selected, the system will ask the user for the name of the texture or pattern to be applied. A library of textures and patterns, in accordance with the present invention, stored in data storage unit 20 subject to call by name. After entering that name, the user then selects a segment on the segmented image with the locating device (light pen 12 or mouse 14). That function will then apply the surface detail to every mesh unit or part of a unit that lies under the segment selected. Each unit in the mesh has a rectangular array of pixels from the stored texture or pattern mapped to it. Since the shape of the mesh unit on the segmented image may not be rectangular, the texture will be distorted to fit the shape of the mesh.

Detailed Description of the Software

Figure 2:
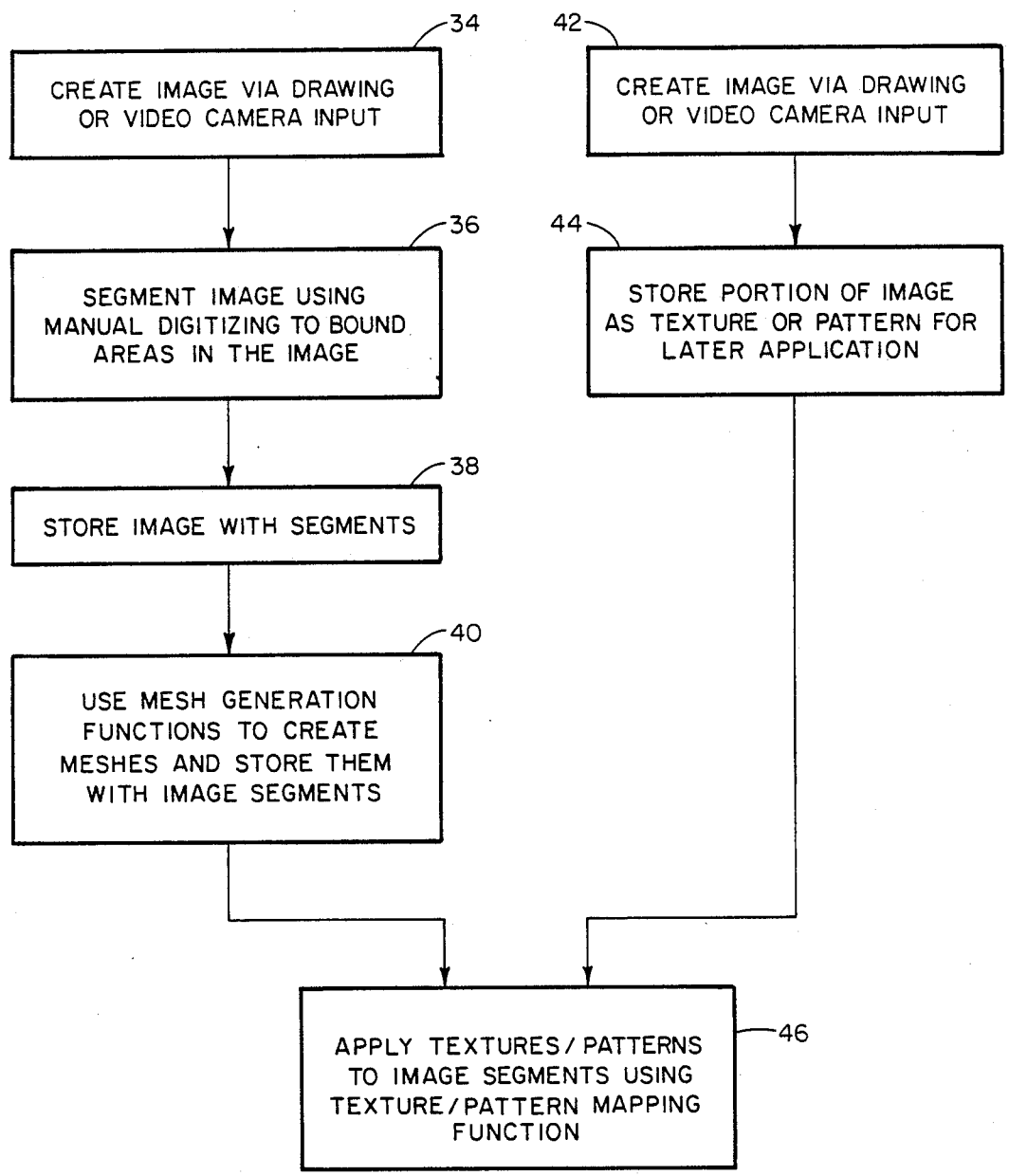
FIG. 2 is a flowchart illustrating a portion of the two-dimensional CAD system according to the present invention.

Referring to FIG. 2, a portion of a two-dimensional CAD system employing the present invention is illustrated. The steps from image generation and preparation through final application of the textures and patterns are outlined.

The process begins with the drawing or video camera imput of an image 34. Drawing may be accomplished using a "paint program", which is a standard feature of many two-dimensional computerized design systems. Video camera input requires the use of a video camera 22 and associated standard hardware for digitizing images to be interfaced with the computer system. In either case, the result will be a rectangular array of pixels making up the image displayed on the graphic CRT 10 of the system, which can be stored to and retrieved from the data storage unit 20. Once an image is created, the next step 36 is for the user to employ a manual digitizing process to bound or separate the different distinct areas making up the image. The program to support this would accept for each segment a series of (x, y) coordinates from the user via a locating instrument such as a light pen 12 or mouse 14. Once all of the (x, y) points for a segment have been entered, the program creates the segment polygon from the points and stores, 38, this definition with the image in the data storage unit 20. That process is repeated until the user has segmented all of the areas of interest in the image. Once all of the segment polygons have been created and stored, the next step 40 is for the user to create meshes on those segments for which surface detail may need to be realistically applied. The description of the functions involved in this process will be described below. Before any surface detail may be applied, however, texture or pattern images 42, must be created and stored 44, in a manner similar to that used when the images were segmented. Those textures or pattern images are also stored as rectangular arrays of pixels on the data storage unit 20 prior to any surface detail mapping taking place. Once all of those processes are completed, the user may then display a segmented image, and by selecting the individual segments apply, 46, the various textures and patterns to different parts of the image. The functions that perform the mapping will also be described below.

Figure 3:
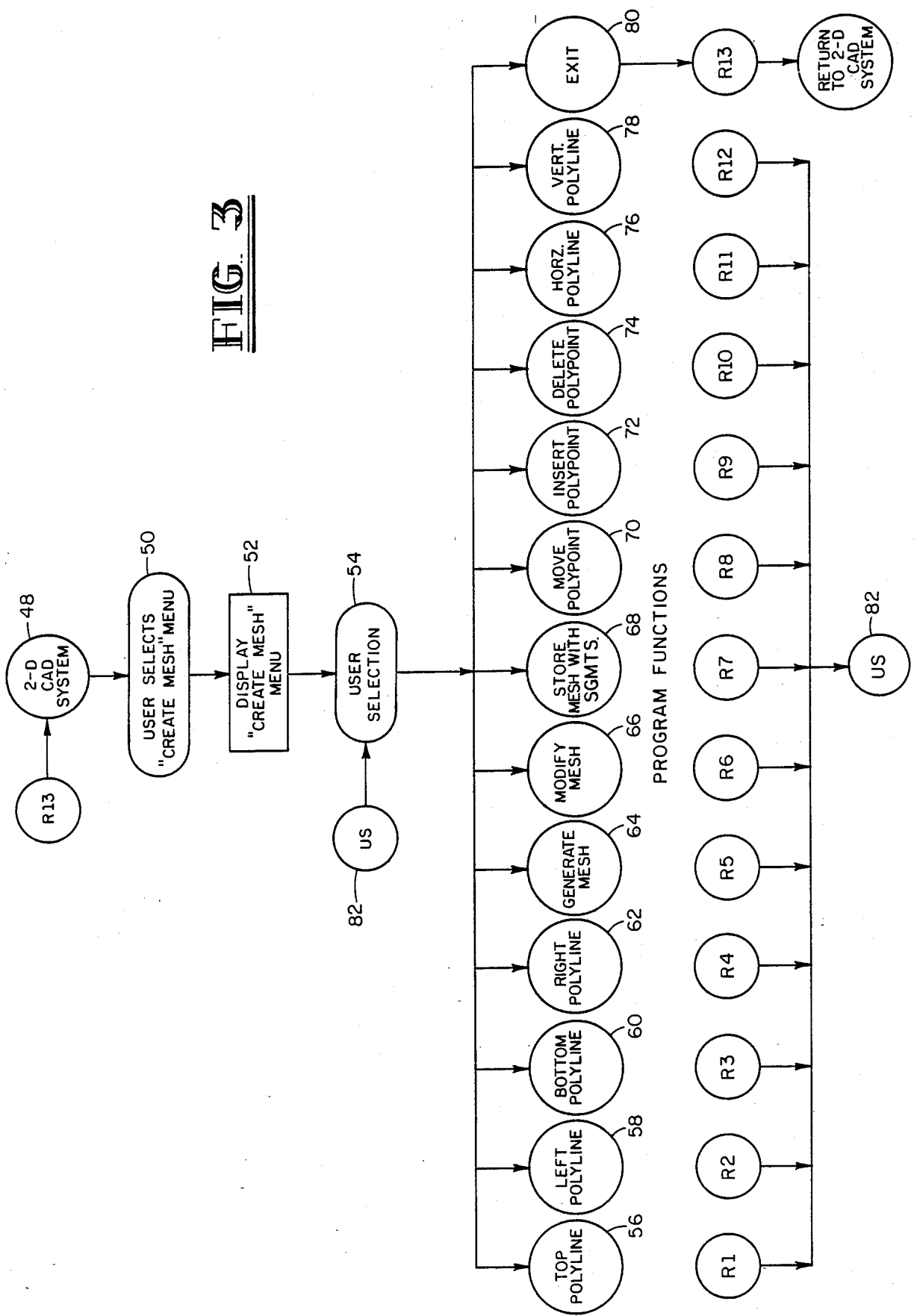
FIG. 3 is a flowchart illustrating the mesh generation functions of the present invention.

FIG. 3 illustrates the main flowchart for the mesh generation functions, and outlines a function that allows the user to select various sub-functions for performing mesh generation from a menu displayed on the system. That function as a whole is invoked from the exits to standard two-dimensional computer aided design system software 48. The current invention may be used with such standard two-dimensional CAD software, and the other details of such software are not pertinent to, and are not necessary for a full understanding of, the present invention. Once invoked from the two-dimensional CAD system 48, the function illustrated in FIG. 3 allows the user to select (50, 52, 54) from a menu any of the individual sub-functions 56–78 associated with mesh generation. Referring to the flowchart, note that there are 12 sub-functions 56–78 that may be invoked following a user selection, plus an 'exit' 80 function. Each of the 12 sub-functions 56–78 listed execute some part of the mesh generation process, and described in detail below. Once each of these sub-functions 56–78 finishes its task, control is returned to the mesh generation function illustrated in FIG. 3, indicated by the labels R1–R12. Control is then passed back to the menu selection (US) 82 so that the user may proceed to the next function. When the 'exit' function is selected, this function terminates and control passes back to the two-dimensional CAD system 48.

Figures 4, 5:
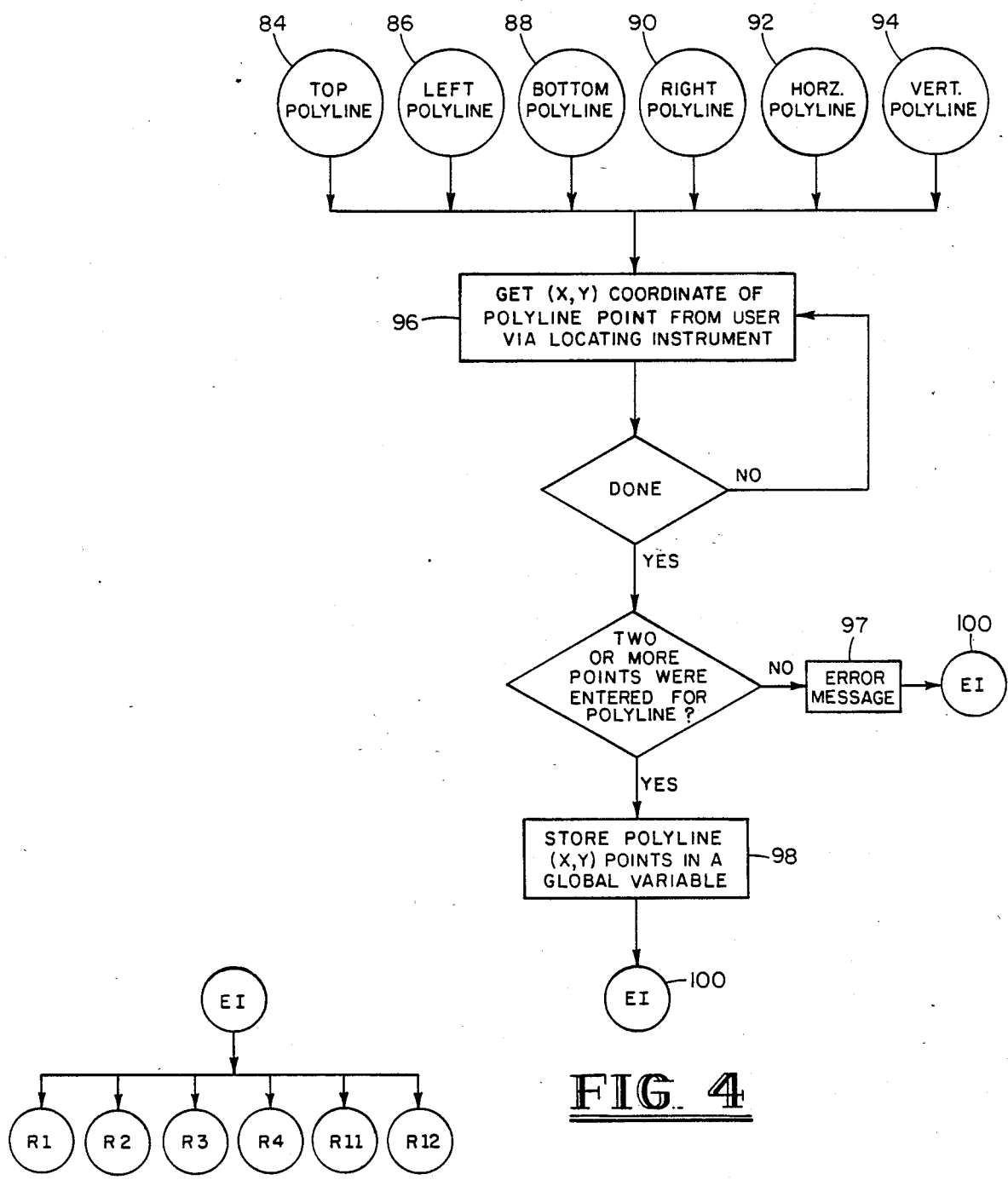
FIG. 4 is a flowchart illustrating the polyline input functions of the present invention.
FIG. 5 is a flowchart illustrating a portion of the polyline input functions of the present invention.

FIG. 4 is a flowchart of the polyline input functions. These polylines form the top 84, left 86, bottom 88, and right 90 bounding polylines of the mesh, in addition to the horizontal 92 and vertical 94 control polylines. Once any one of those six functions is selected, the user is prompted to digitize a series of (x, y) points 96 that will form the polyline. The points are then entered by the user through a locating instrument such as a light pen 12 or mouse 14. If fewer than two points were entered, an error message 97 is given, and no points are stored. If two or more points were digitized, they are stored in a global variable 98, and the polyline input function returns control to the calling program 100. FIG. 5 illustrates that once control is returned, additional polyline functions may be called. Once all four bounding polylines are digitized, the user may then generate the mesh. The horizontal and vertical polylines for controlling the interior shape of the mesh are optional. The mesh generator will then use the definitions of the polylines stored in the global variables for calculating the mesh.

After the user digitizes a polyline for generating a mesh, there may be need of a small change in it's shape; hence three editing functions are included in the mesh generation functions.

Figure 6:
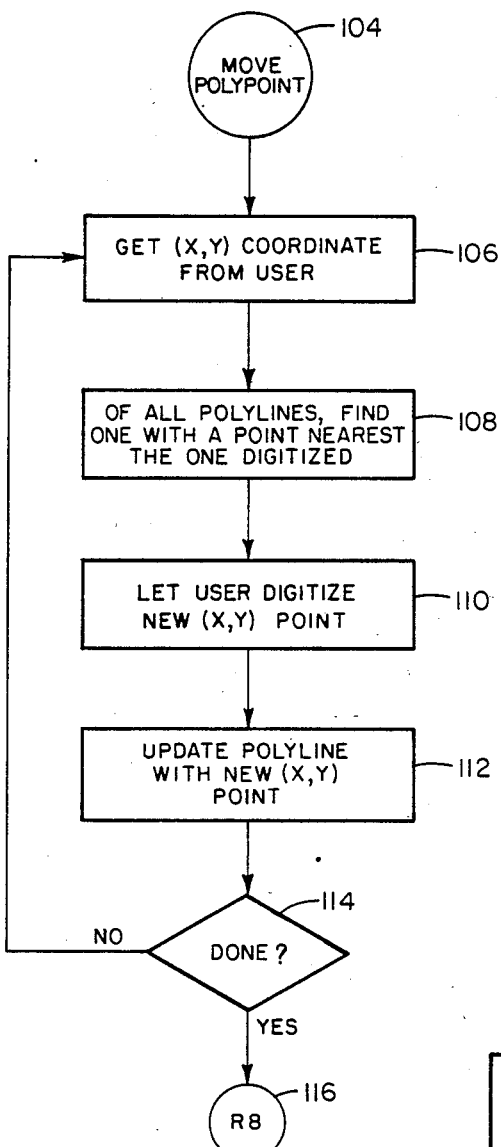
FIG. 6 is a flowchart illustrating the "Move Polypoint" function of the present invention.

FIG. 6 is a flowchart detailing the "Move Polypoint" 104 editing function. Once this function is selected, the user must digitize 106 an (x, y) coordinate using a locating instrument. The function compares 108 this coordinate with all of the (x, y) coordinates making up the polylines stored in global variables; the one it is closest to is selected. The user must then digitize 110 a second (x, y) point, and the selected point is replaced 112 with this new (x, y) coordinate. This process is repeated until the user indicates 114 that no more points need to be moved; control is then passed back to the calling program 116.

Figure 7:
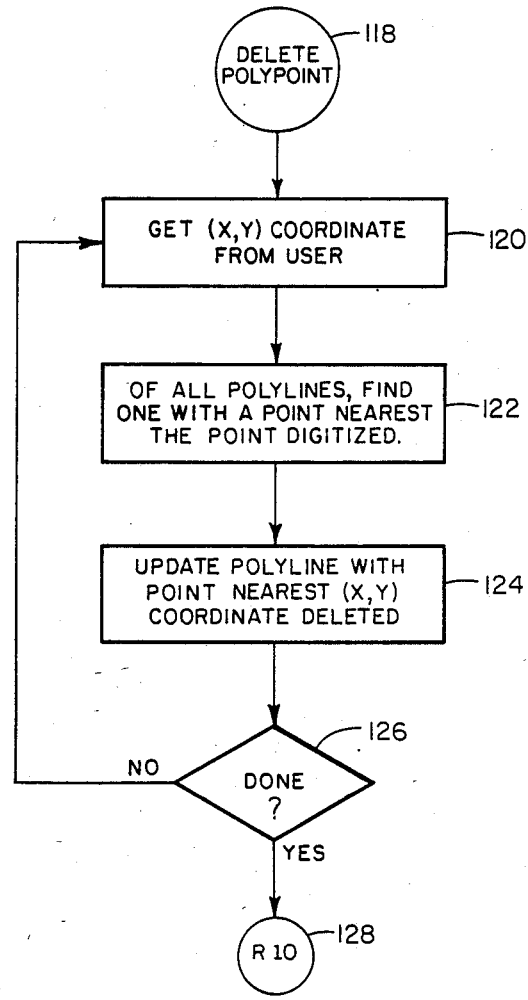
FIG. 7 is a flowchart illustrating the "Delete Polypoint" function of the present invention.

FIG. 7 is a flowchart detailing the "Delete Polypoint" 118 editing function. Once this function is selected, the user must digitize 120 an (x, y) coordinate using a locating instrument. The function compares 122 this coordinate with all of the (x, y) coordinates making up the polylines stored in global variables; the one it is closest to is selected, and subsequently deleted 124 from its corresponding polyline. This process is repeated until the user indicates 126 that no more points need to be deleted; control is then passed back to the calling program 128.

Figure 8:
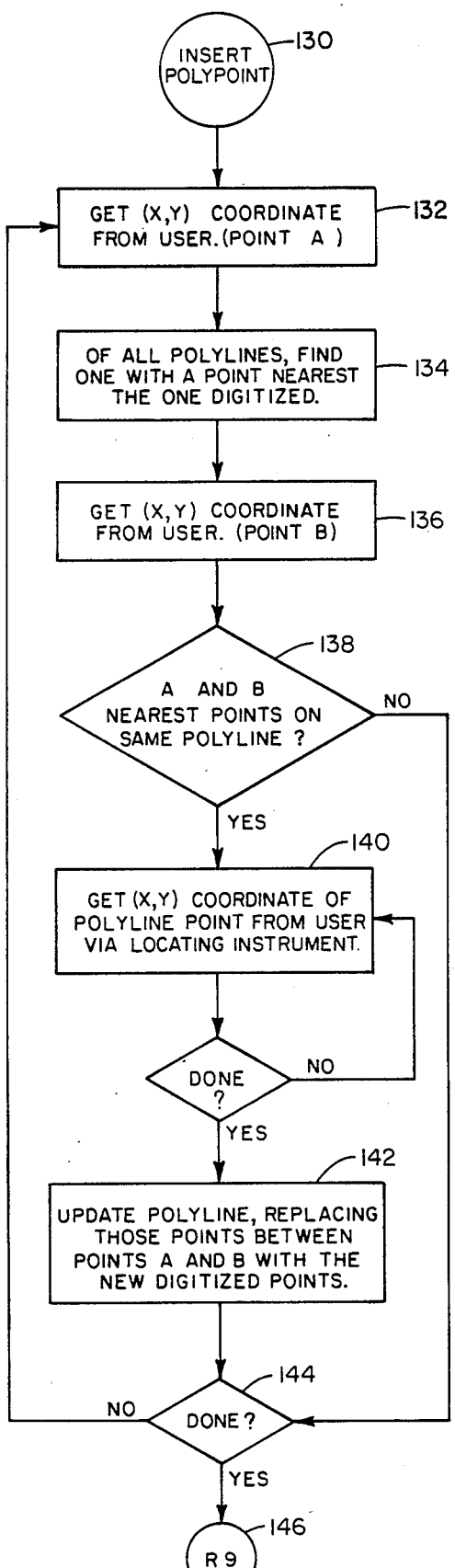
FIG. 8 is a flowchart illustrating the "Insert Polypoint" function of the present invention.

FIG. 8 is a flowchart detailing the "Insert Polypoint" 130 editing function. Once this function is selected, the user must digitize 132, 136 two (x, y) coordinates using a locating instrument. The function compares 134 these coordinates with all of the (x, y) coordinates making up the polylines stored in global variables; the ones they are closest to are selected. If both of these points are on the same polyline 138, the user is then prompted 140 to digitize a series of (x, y) points. Once these are entered, they are used to replace 140 the portion of the polyline lying between the two selected points. This process is repeated until the user indicates 144 that no more points need to be inserted. Control is then passed back to the calling program 146.

Figure 9:
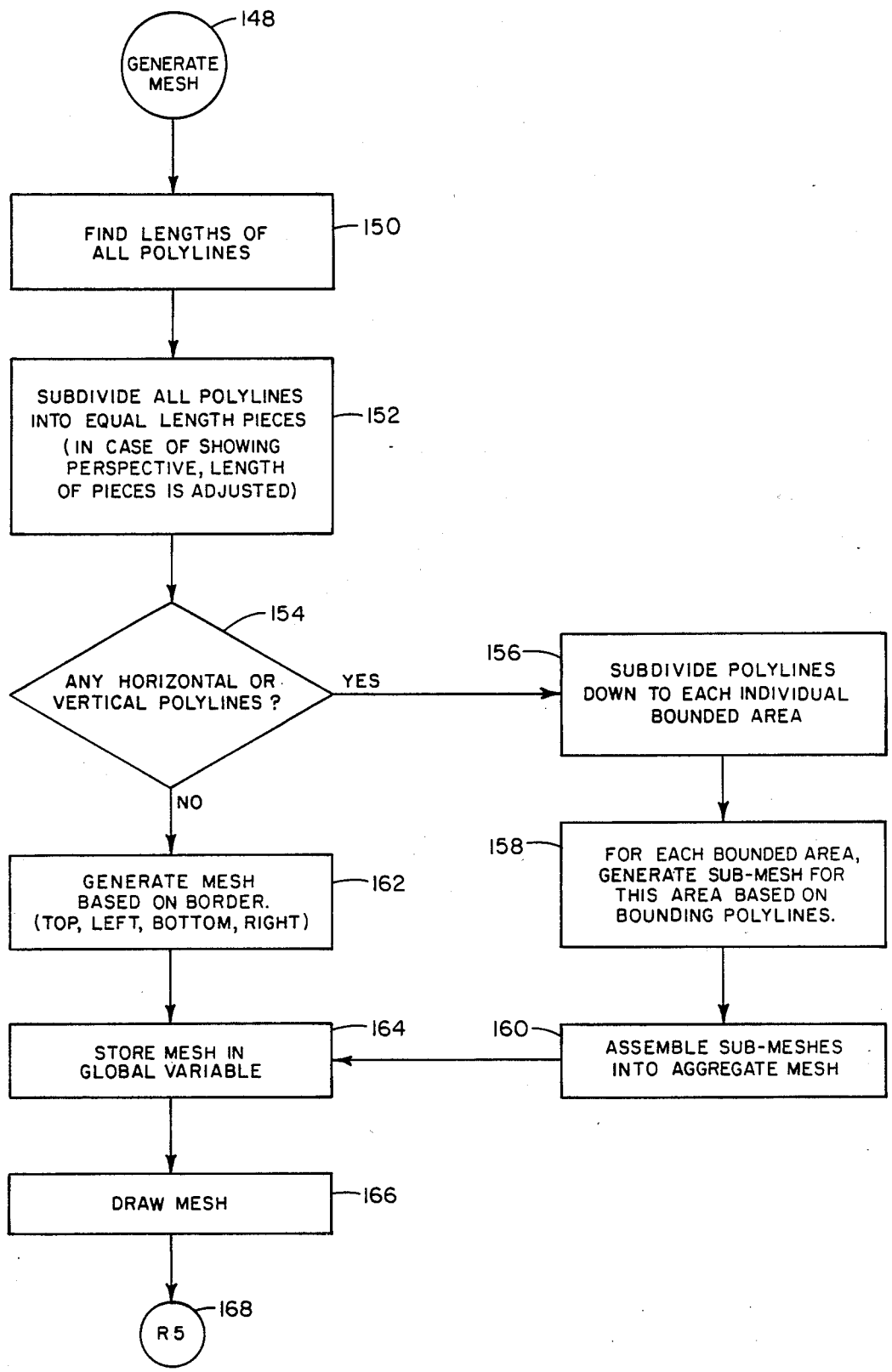
FIG. 9 is a flowchart illustrating the mesh generation function of the present invention.

The actual mesh generation 148 is illustrated in FIG. 9. Once the user has digitized all of the polylines that will be used in the mesh generation, this function may be invoked to generate the mesh based on the shape of all of these polylines. The mathematical techniques for generating two- and three-dimensional meshes based on four bounding polylines; (see, for example, "Mapping Methods for Generating Three-Dimensional Meshes", *Computers in Mechanical Engineering*, (Aug. 1982) are known and the actual mathematics of the process need not be repeated here. Suffice it to say that, given four bounding polylines, the left, right, bottom, and top, the shape of the mesh lying therein will be a combination of those four shapes. The shape of the 'horizontal' spans in the mesh will gradually change from the shape of the top polyline to the shape of the bottom polyine; likewise the shape of the top polyline to the shape of the bottom polyline; likewise the 'vertical' spans will envolve from the shape of the left polyline to that of the right. The mesh will then consist of many 'horizontal' and 'vertical' spans intersecting each other to form many quadrilaterals. These quadrilaterals are then used in the mapping programs to guide the shape of the surface detail as it is applied. The function detailed in FIG. 9 performs some pre-processing on the polylines prior to the mesh generator being invoked, and will store the mesh in a global variable once it has been generated. If the mesh generation only involves the top, left, bottom, and right polylines, (no interior horizontal or vertical) this function will only calculate 162 the intersections of the four bounding polylines with one another, call the mesh generator once, and store 164 the resulting mesh in a global variable. If, in addition, there are horizontal or vertical polylines, this function must first calculate 156 the intersections of all of the vertical polylines (including left and right) with all of the horizontal polylines (including top and bottom). For each sub-area within the top, left, bottom and right polylines that is separated from the others by interior polylines, this function then generates four temporary bounding polylines 158 that are used as input to the mesh generator. Each of these sub-areas will then have a mesh generated separately, and this function will composite 160 all of these meshes into a global variable 164 to form the aggregate mesh. Once the complete mesh in generated 166, control is returned to the calling program 168.

Figure 10:
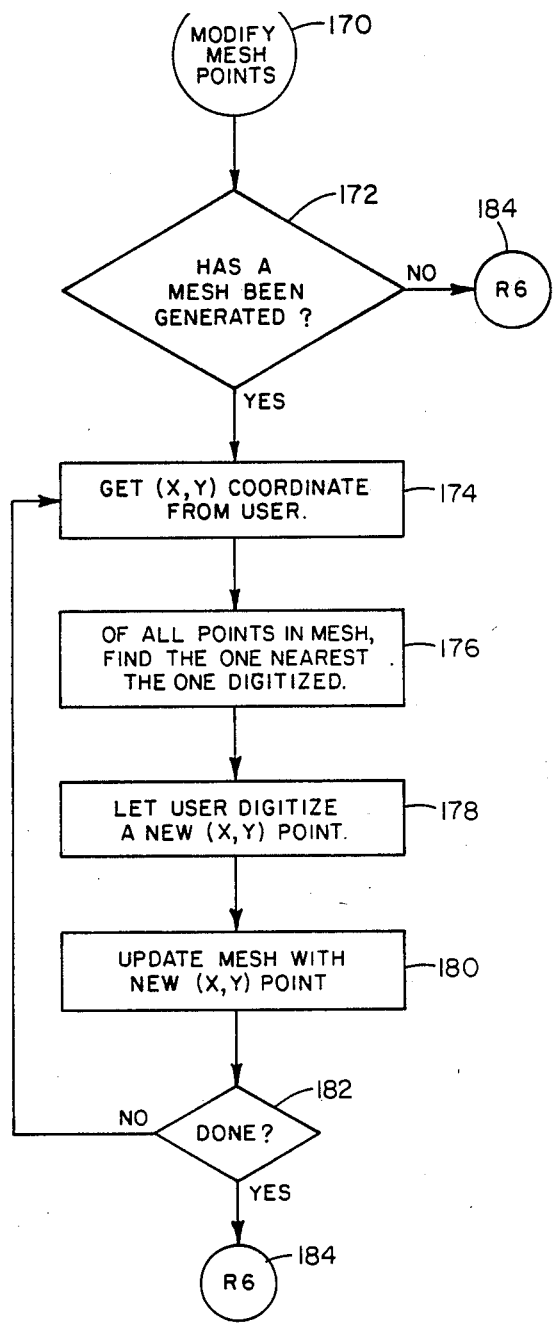
FIG. 10 is a flowchart illustrating the mesh editing function of the present invention.

FIG. 10 is a flowchart which describes the basic mesh editing 170 function according to the present invention. This function allows the user to select points in the generated mesh and move them to effect small local changes to the shape of the mesh. Once this function is selected, and assuming a mesh has been generated 172, the user must digitize 174 an (x, y) coordinate using a locating instrument. The function compares 176 this coordinate with all of the (x, y) coordinates making up the mesh points stored in the global variable; the one it is closest to is selected. The user must then digitize 178 a second (x, y) point, and the selected point is replaced 180 with this new (x, y) coordinate. This process is repeated until the user indicates 182 that no more points need to be moved; control is then passed back to the calling program—184.

Figure 11:
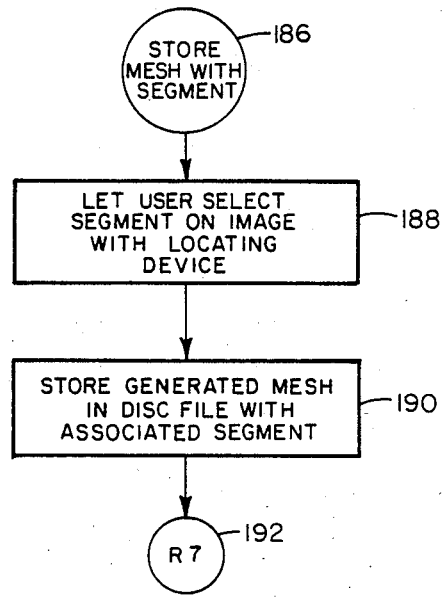
FIG. 11 is a flowchart illustrating the mesh storing function of the present invention.

The final "Mesh Generation" related function is illustrated in FIG. 11. This function 186 allows the user to associate and store a mesh with a segment polygon on an image so that it may be used later for guiding the application of surface detail to the portion of the image contained within the segment. The function first 188 requires the user to use the locating instruments to select one of the segments on the image. The actual mechanism of selecting a segment (or any entity displayed on the CRT) will vary from one CAD system to another, and need not be detailed here. Suffice it to say that the segment may be selected in accordance with the techniques employed by the particular CAD system being used. Once the segment has been selected, this function will store 180 the mesh with the selected segment on the data storage device 20. The data that needs to be stored includes the number of rows in the mesh, the number of columns, and the (x, y) coordinate of every point in the mesh with respect to the local coordinate system of the image currently displayed. Once the mesh has been stored with the selected segment, control is returned to the calling program 192.

Figure 12:
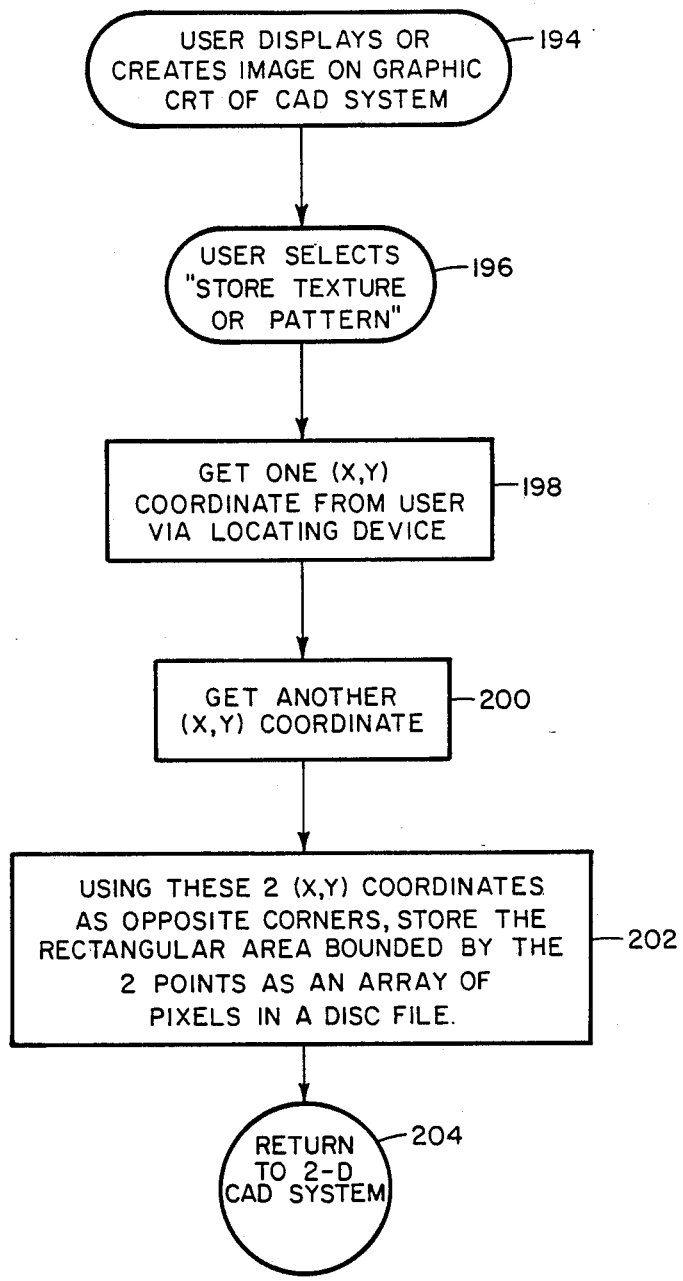
FIG. 12 is a flowchart illustrating the store texture or pattern of the present invention.

The first "Texture/Pattern" related function is illustrated in FIG. 12. This figure is a flowchart which describes the process of creating and storing a texture or pattern which may later be applied as surface detail to a segmented image. The method for obtaining the rectangular array of pixels making up the texture or pattern is similar to that for obtaining the image that is later segmented. Assuming that an image 194 is already displayed on the graphic CRT 10 of the CAD system, this function requires the user to first select the "Store Texture or Pattern" function 196 and then digitized 198, 200 two (x, y) coordinates within or around the image displayed. These coordinates are understood to be opposite corners of the rectangular array of pixels that the user wants to store a texture or pattern. Once the points are selected, the rectangular array of pixels is stored 202 on the data storage unit 20 for later retrieval and application as surface detail to the segmented image. Once the storing is completed, control is passed back to the calling program 204.

Figure 13:
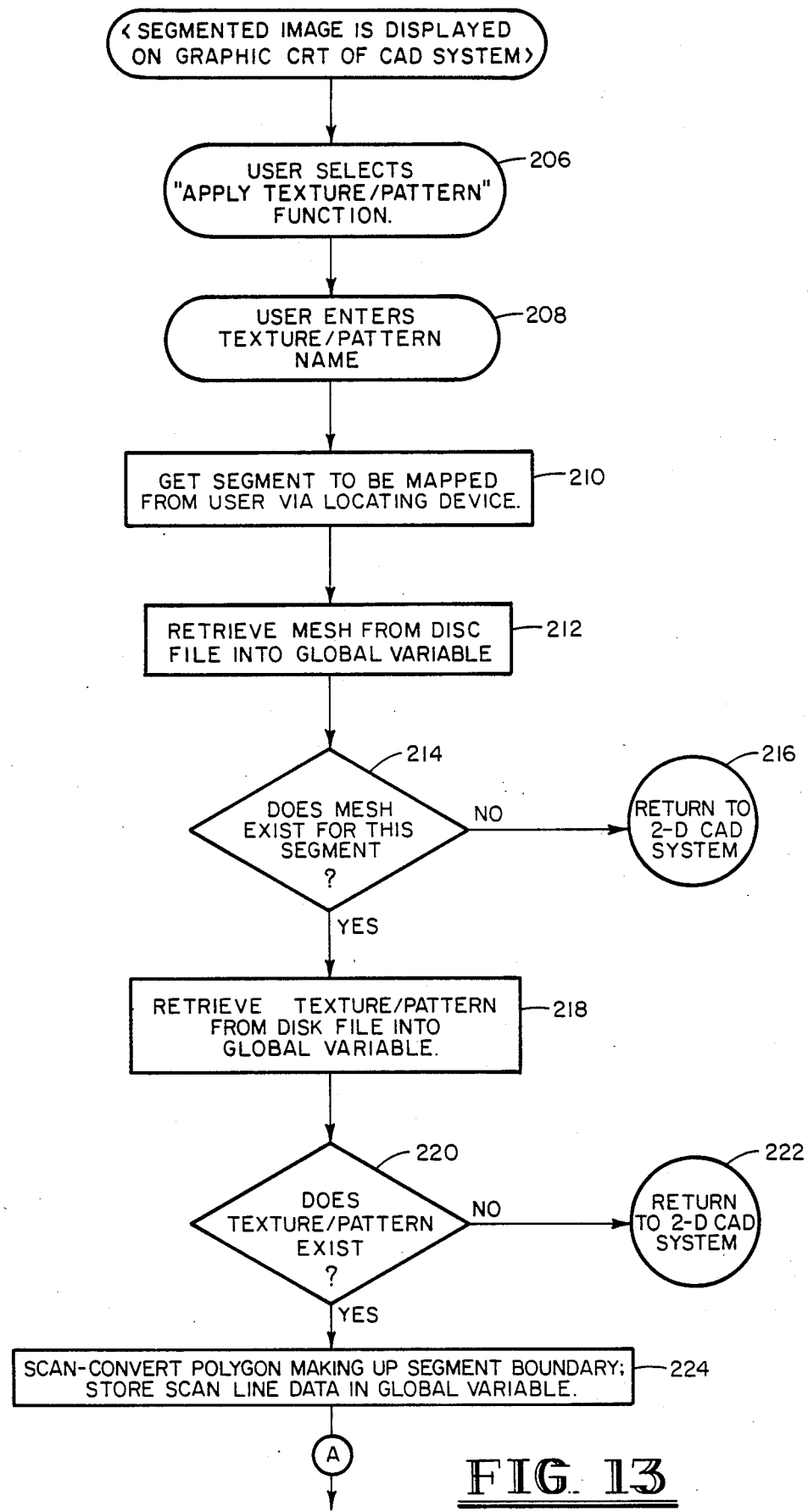
FIG. 13 is a flowchart illustrating the first portion of the mapping function of the present invention.
Figure 14:
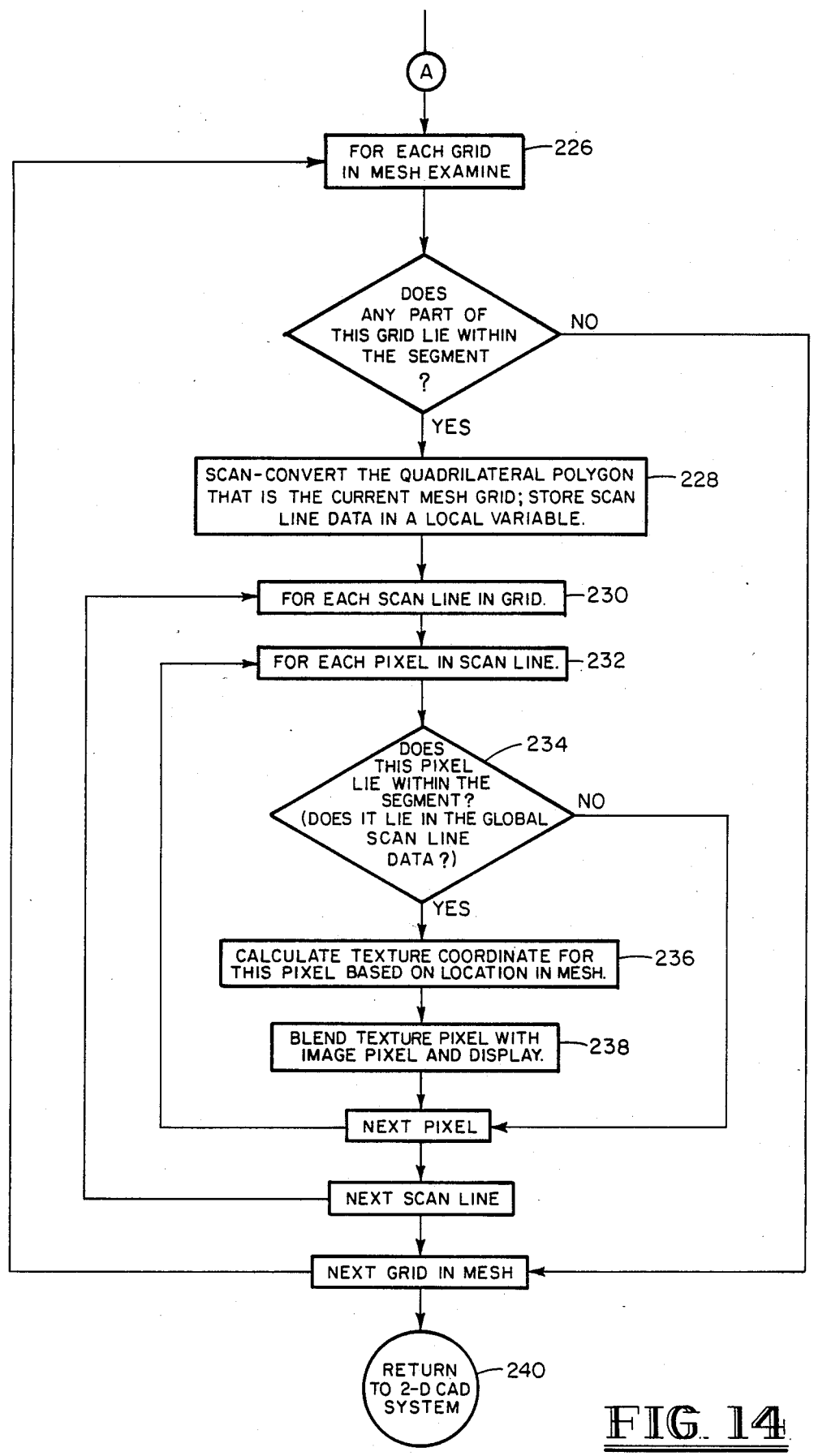
FIG. 14 is a flowchart illustrating the second portion of the mapping function of the present invention.

The second "Texture/Pattern" related function is illustrated in FIGS. 13 and 14. Referring to FIG. 13, this is the function that actually performs mapping of the surface detail to the segmented image. Once this function is selected 206, the user enters the name of the pattern or texture 208 and also selects 210 the segment on the image to which the surface detail is to be applied. The mesh stored with the selected segment will be retrieved 212; if no mesh exists 214, an error message will be reported and control will be passed back to the calling program 216. The texture or pattern names by the user will also be retrieved 218; if no file exists 220, control will also be passed back to the calling program 222. The (x, y) points making up the boundary of the segment polygon are now scan-converted 224; that is, the list of scan lines (rows of pixels) contained within the segment is created and stored. Now that the segment, mesh, and surface detail are all contained in global variables, the actual mapping can get underway. Referring to FIG. 14 every grid (quadrilateral) in the mesh is examined 226 to determine if any part of it lies within the boundary of the segment. If any part of it does, the grid is also scan-converted 228, and the list of scan lines temporarily saved 230. Each of the scan lines from the grid is examined 232 on a pixel-by-pixel basis. If a pixel is found to lie within the segment 234 (checked against the segment list of scan lines) a texture coordinate 236 for this pixel is calculated based on the location of the pixel in the grid. And on the position of the grid in the mesh, with the "upper left" of the mesh (corner of the top and left polylines) serving as the origin. The texture coordinates are then mapped back to the array of pixels making up the texture or pattern, and one of them is selected. If antialiasing of the surface detail is to be effected as it is applied, the texture coordinate may be thought of as lying inside four of the texture or pattern pixels; bilinear interpolation on these four pixel colors will yield an appropriate pixel color for the surface detail at this point. The texture or pattern pixel color and the pixel color at this position in the grid scan line are blended together 238, and a pixel of this new color is displayed on the graphic CRT at the same location in the grid scan line. This process is repeated for every pixel in the grid scan line, for every scan line in the grid, and for every grid in the mesh. Once completed, control will be passed back to the calling program 240.

The invention described herein for providing a surface detail to two-dimensional computer images has been found to be a very useful invention for enhancing the realism of material changes on apparel and textile covered objects designed on a computer.

Although the invention has been described in conjuction with the foregoing specific embodiment, many alternatives, variations and modifications are apparent to those of ordinary skill in the art. Those alternatives, variations and modifications are intended to fall within the spirit and scope of the appended claims.

I claim:

1. In a computer-assisted design system, a method for providing surface detail to computer generated two-dimensional graphic images of three-dimensional surfaces to create a three-dimensional appearance comprising:
   generating a perspective mesh on said computer-generated two-dimensional graphic image such that said mesh creates a three-dimensional visual appearance;
   mapping surface detail to said mesh point-by-point such that said surface detail produces a three-dimensional appearance; and
   producing a graphic visual image of said two-dimensional graphic image with said surface detail applied.

2. A method for providing surface detail to computer-generated two-dimensional graphic images as set forth in claim 1, wherein the step of generating a perspective mesh comprises:

dividing said two-dimensional image into segments, each segment representing a portion of said three-dimensional object;

circumscribing each of said segments by polygons; and calculating a perspective mesh for each segment circumscribed by each said polygon, said perspective meshes each comprising a plurality of horizontal and vertical lines spatially arranged to form a plurality of quadrilaterals representing the three-dimensional surface forms for said three-dimensional object.

3. A method for providing surface detail to computer-generated two-dimensional graphic images as in claim 1, wherein said step of mapping comprises:

a. scan-converting each quadrilateral within said mesh;

b. calculating a surface detail coordinate for each pixel lying within each segment based on the location of the pixel in the quadrilateral and on the location of the quadrilateral in the mesh;

c. mapping the surface detail coordinates to the array of pixel making up the selected surface detail and selecting the appropriate pixel;

d. repeating steps a-c for every pixel in the quadrilateral scan line, and for every scan line in the quadrilateral, and for every quadrilateral in the mesh.

4. In a computer-assisted design system, a method for providing surface detail to computer generated two-dimensional graphic images of three-dimensional surfaces to create a three-dimensional appearance comprising:

a. producing a two-dimensional image of a three-dimensional object in a digital form for storage and processing by a digital computer;

b. dividing said two-dimensional image into segments, each segment representing a portion of said three-dimensional object;

c. circumscribing said segments by polygons in digital form for storage and processing by said digital computer;

d. generating at least one mesh within each segment wherein said at least one mesh creates a three-dimensional visual appearance;

e. repeating steps b-d until meshes have been generated for all segments of said two-dimensional image;

f. storing said segments with said meshes in a data storage unit;

g. producing at least one image of surface detail in the form of a rectangular array of pixels for storage and processing by a digital computer;

h. storing said surface detail images in said data storage unit;

i. mapping said surface detail to said mesh within each said segment such that said surface detail produces a three-dimensional appearance; and j. producing a graphical visual image of said two-dimensional image covered by said surface detail wherein said image presents a three-dimensional appearance.

5. A method for providing surface detail to computer-generated two-dimensional graphic images as set forth in claim 4 wherein said step of producing a two-dimensional image comprises:

forming a video image of said three-dimensional object; and converting that video image into a digital form suitable for storage and processing by a digital computer.

6. A method for providing surface detail to computer-generated two-dimensional graphic images as set forth in claim 4 wherein said step of producing a two-dimensional image comprises:

creating a graphic representation of said three-dimensional object in two-dimensional form; and converting said graphic representation into a digital form suitable for storage and processing by a digital computer.

7. A method for providing surface detail to computer generated two-dimensional graphic images as set forth in claim 4 wherein said step of circumscribing said segments comprises:

displaying said two-dimensional image on a graphic visual input/output device; and forming polygons around each segment as displayed on said graphic visual input/output device.

8. A method for providing surface detail to computer-generated graphic images as set forth in claim 7 wherein said step of forming polygons comprises:

entering information representing the boundaries of said polygons into said computer using a computer input device.

9. A method for providing surface detail to computer-generated two-dimensional graphic images as set forth in claim 4 wherein said step of generating at least one mesh comprises:

displaying at least one of said segments bounded by said polygon on a graphic visual input/output device;

entering information into said computer for creating a series of bounding polylines which enclose each said segment; and calculating a perspective mesh contained by said bounding polylines which perspective mesh consists of a plurality of horizontal and vertical lines spatially arranged to form a plurality of quadrilaterals representing a three-dimensional surface for each said segment, as such three-dimensional surface would appear to the eye, in two-dimensional form.

10. A method for providing for providing surface detail to computer-generated two-dimensional graphic images as set forth in claim 9 further comprising:

modifying the locations of points lying within said perspective mesh to effect local changes in the shape of the mesh.

11. A method for providing surface detail to computer-generated two-dimensional graphic images as set forth in claim 10 wherein said step of modifying the locations of points comprises:

A. entering x, y coordinates into said computer for a point within said mesh;

B. comparing the x, y coordinates entered in step a. with stored x, y coordinates for the existing mesh;

C. selecting the stored x, y coordinates closest to the x, y coordinate entered in step a.;

D. entering a second x, y coordinate into said computer, said second x, y coordinate representing the desired modification; and E. replacing the stored x, y coordinate with said second x, y coordinate.

12. A method for providing surface detail to computer-generated two-dimeinsional graphic images as set forth in claim 9 wherein said step of calculating a perspective mesh comprises:
calculating the intersection of said bounding polylines; and
generating a perspective mesh based on those bounding polylines.

13. A method for providing surface detail to computer-generated two-dimensional graphic images as set forth in claim 9 further comprising:
controlling the interior shape of said mesh by entering information into said computer for creating additional horizontal polylines and additional vertical polylines within each segment circumscribed by said boundary polylines, said additional vertical and horizontal polylines creating sub-areas within each said segment.

14. A method for providing surface detail to computer-generated two-dimensional graphic images as set forth in claim 13 wherein said step of calculating a perspective mesh comprises:
calculating the intersection of all vertical polylines including the vertically disposed bounding polylines with all of said horizontal polylines including the horizontally disposed bounding polylines;
generating temporary interior boundary polylines for each sub-area;
generating a perspective mesh for each sub-area based on those temporary interior boundary polylines; and
creating a composite perspective mesh for each said segment for each perspective mesh generated for each sub-area.

15. A method for providing surface detail to computer-generated two-dimensional graphic images as set forth in claim 9 wherein said step of entering information into the computer for creating a series of bounding polylines comprises:
entering at least two polypoints into the computer which polypoints form each of said bounding polylines.

16. A method for providing surface detail to computer-generated two-dimensional graphic images as set forth in claim 15 further comprising:
modifying said bounding polylines by moving, deleting, or inserting at least one of said polypoints forming said bounding polylines.

17. A method for providing surface detail to computer-generated two-dimensional graphic images as set forth in claim 9 wherein said step of producing at least one image of surface detail comprises:
entering at least one image of at least one surface detail feature into the computer in such form as to permit display on a graphic visual input/output device; and
storing at least a portion of said surface detail image in a data storage device through storing the information necessary to define the color and intensity attributes of each elemental point on the graphic input/output device displaying said image, such information thus defining a rectangular array of pixels representing the surface detail.

18. A method for providing surface detail to computer-generated two-dimensional graphic images as set forth in claim 17 wherein said surface detail comprises a pattern.

19. A method for providing surface detail to computer-generated two-dimensional graphic images as set forth in claim 17 wherein said surface detail comprises texture.

20. A method for providing surface detail to computer-generated two-dimensional graphic images as set forth in claim 17 wherein said step of mapping comprises:
A. selecting a segment of the two-dimensional image to which surface detail is to be applied;
B. selecting the surface detail to be applied;
C. retrieving the selected segment and mesh from data storage;
D. retrieving the selected surface detail from data storage;
E. scan-converting the x, y points forming the boundary of the selected segment by creating and storing a list of scan lines contained within the selected segment;
F. examining each quadrilateral within said mesh to determine whether any part of said quadrilateral lies within the bounding polylines of the selected segment;
G. scan-converting each quadrilateral in said mesh, wherein at least a portion of said quadrilateral lies within the bounding polyline of the selected segment, by converting and temporarily storing a list of scan lines for each quadrilateral;
H. examing each scan-line from step g. on a pixel-by-pixel basis to determine those pixels lying within the selected segment;
I. calculating a surface detail coordinate for each pixel lying within the selected segment based on the location of the pixel in the quadrilateral and on the location of the quadrilateral in the mesh;
J. mapping the surface detail coordinates back to the array of pixels making up the selected surface detail and selecting the appropriate pixel;
K. blending the surface detail pixel color and the pixel color at this position in the mesh;
L. repeating steps e-k for every pixel in the quadrilateral scan line, for every scan line in the quadrilateral, and for every quadrilateral in the mesh.

21. a system for providing surface detail to computer-generated two-dimensional graphic images in a computer-assisted design system of three-dimensional free-form surfaces to create a three-dimensional appearance comprising:
means for producing a two-dimensional image of a three-dimensional object in a form for storage and processing by a digital computer;
means for dividing said two-dimensional image into segments, each segment representing a portion of said object;
means for circumscribing said segments by polygons in digital form for storage and processing by a digital computer;
means for generating at least one mesh within each segment wherein said at least one mesh creates a three-dimensional visual appearance;
means for producing at least one image of surface detail in the form of a rectangular array of pixels for storage and processing by a digital computer;
means for storing said surface detail image in a data storage unit accessable by said digital computer;
means for mapping said surface detail to said mesh within said segment such that said surface detail produces a three-dimensional appearance; and means for creating a graphic visual image of said two-dimensional image, covered by said surface detail, giving a three-dimensional appearance.

22. A system for providing surface detail as set forth in claim 21 wherein said means for producing a two-dimensional image comprises:
   means for forming a video image of the three-dimensional object; and
   means for converting said video image into a digital form suitable for storage and processing by additional computer.

23. A system for providing surface detail as set forth in claim 21 wherein said means for producing a two-dimesional image comprises:
   means for creating a graphic representation of said three-dimensional object in two-dimensional form; and
   means for converting said graphic representation into a digital form suitable for storage and processing by a digital computer.

24. A system for providing surface detail as set forth in claim 21 wherein said means for circumscribing said segments comprises:
   means for displaying said two-dimensional image on a graphic visual input/output device; and
   means for entering information into said computer representing polygons formed around each segment as displayed on said graphic visual input/output device.

25. A system for providing surface detail as set forth in claim 21 wherein said means for generating at least one mesh comprises:
   means for displaying at least one of said segments bounded by said polygon on a graphic visual input/output device;
   means for entering information into the computer for creating a series of bounding polylines which enclose said segment; and
   means for calculating a perspective mesh contained by said bounding polylines perspective which mesh consists of a plurality of horizontal and vertical lines spatially arranged to form a plurality of quadrilaterals representing a three-dimensional surface for said segment, as such surface would appear to the eye, in two-dimensional form.

26. A system for providing surface detail as set forth in claim 21 wherein said means for producing at least one image of surface detail in the form of a rectangular array of pixels comprises:
   means for entering at least one image of at least one surface detail feature into the computer in such form as to permit display on a graphic visual input/output device; and
   means for storing at least a portion of said surface detail image in a data storage device, said storage device permitting the storing of information necessary to define the color and intensity attributes of each elemental point on the graphic visual input/output device displaying said image, such information defining a rectangular arrray of pixels representing the surface detail.

27. A system for providing surface detail as set forth in claim 21 wherein said means for mapping comprises:
   means for selecting a segment of the two-dimensional image to which said surface detail is to be applied;
   means for selecting the surface detail to be applied;
   means for retrieving the selected segment and mesh from data storage;
   means for retrieving the selected surface detail from data storage;
   means for scan-converting the x, y points forming the boundary of the selected segment by creating and storing a list of scan lines contained within the selected segment;
   means for examining each quadrilateral in said mesh to determine whether any part of said quadrilateral lies within the bounding polylines of the selected segment;
   means for scan-converting each quadrilateral in said mesh and temporarily storing a list of scan-lines for each quadrilateral;
   means for examining each scan-line on a pixel-by-pixel basis to determine those pixels lying within the selected segment;
   means for calculating a surface detail coordinate for each pixel lying within the selected segment based on the location of the pixel and the quadrilateral and on the location of the quadrilateral in the mesh;
   means for mapping the surface detail coordinates back to the array of pixels making up the selected surface detail and means for selecting the appropriate pixel;
   means for blending the surface detail pixel color and the pixel color at this position in the mesh.

* * * * *

REEXAMINATION CERTIFICATE (2103rd)

United States Patent [19]
Falk

[11] B1 4,888,713
[45] Certificate Issued  Oct. 12, 1993

[54] SURFACE DETAIL MAPPING SYSTEM

[75] Inventor: Edward K. Falk, Grand Rapids, Mich.

[73] Assignee: CDI Technologies, Inc., Grand Rapids, Mich.

Reexamination Request:
No. 90/002,200, Nov. 2, 1990

Reexamination Certificate for:
| | |
|---|---|
| Patent No.: | 4,888,713 |
| Issued: | Dec. 19, 1989 |
| Appl. No.: | 904,682 |
| Filed: | Sep. 5, 1986 |

[51] Int. Cl.⁵ .................... G06F 15/72; G06F 3/14
[52] U.S. Cl. ................................ 395/125; 340/723; 340/729; 395/119; 395/500; 364/474.24
[58] Field of Search ... 364/200 MS File, 900 MS File, 364/518, 521, 522, 146, 188, 191, 474.24, 474.25; 340/721, 729, 734, 723; 358/22, 183, 101, 104; 395/135, 120, 125, 126, 119, 500

[56] References Cited

U.S. PATENT DOCUMENTS

| | | | |
|---|---|---|---|
| 3,621,214 | 11/1971 | Romney et al. | 364/522 |
| 4,261,012 | 4/1981 | Maloomian | 360/33.1 X |
| 4,539,585 | 9/1985 | Spackova et al. | 434/371 X |
| 4,949,286 | 8/1990 | Ohba | 358/93 X |

FOREIGN PATENT DOCUMENTS

62-172465  7/1987  Japan.

OTHER PUBLICATIONS

Procedural Elements for Computer Graphics by David F. Rogers, pp. 354–362, (McGraw-Hill 1985) (excerpt).
"Texture and Reflection in Computer Generated Images" by James F. Blinn and Martin E. Newell, pp. 542–547, Communications of the ACM, (Oct. 1976).
"Simulation of Wrinkled Surfaces" by James F. Blinn, Computer Graphics, vol. 12, Proceedings of SIGGRAPH (1978) pp. 286–292.
"Mapping Methods for Generating Three-Dimensional Meshes" by W. A. Cook and W. R. Oakes, pp. 67–72, Computers in Mechanical Engineering, (Aug. 1982).
"Computer Display of Curved Surfaces" by Edwin Catmull, pp. 11–17, Proceedings of IEEE Conference on Computer Graphics, Pattern Recognition and Data Structure, (May 1975).
"Electronic Clones are Coming" by Don Sutherland, pp. 106–107, 144–148, Popular Photography, (Dec. 1976).
"Digital Scene Simulation $^{SM}$: The Synergy of Computer Technology and Human Creativity" by Gary Demos, Maxine D. Brown and Richard A. Weinberg, pp. 22–31, Proceedings of the IEEE, vol. 72, No. 1, (Jan. 1984).
"Combining Physical and Visual Stimulation—Creation of the Planet Jupiter for the Film '2010'" by Larry Yeager, Craig Upson and Robert Myers, pp. 85–93, ACM SIGGRAPH proceedings '86, vol. 20, No. 4 (Aug. 1986).
"3-D Images for the Film Industry" by W. Mike Tyler, Computer Graphics World (Jul. 1984).
"Supercomputing for High Complexity Computer Graphics" by Gary Demos and Greg Colbrook, unpublished (1984).
"Digital Productions Honored" by Louis Chunovic, Millimeter (Jun. 1985).
"Pyramidal Parametrics" by Lance Williams, pp. 1–11, Computer Graphics, vol. 17, No. 3 (Jul. 1983).
"A Subdivision Algorithm for Computer Display of Curved Surfaces" by Edwin Catmull, pp. 74–77, Technical Report, Computer Sciences Department, University of Utah (Dec. 1974) (excerpts).
"On Coons and Other Methods for the Representation of Curved Surfaces" by A. R. Forrest, pp. 341–359, Computer Graphics and Image Processing (1972).
"A Generalized Graphic Preprocessor for Two-Dimensional Finite Element Analysis" by Robert Haber et al., pp. 323–329, Computer Graphics (ACM SIGGRAPH), vol. 12, No. 3 (1978).
"The Art of Computer Graphics—Computer Graphics in Art" by Franz Herbert, pp. 381 and 383, Computers and Graphics, vol. 7, No. 3–4 (1983).
"MOVIE.BYU—1981" by H. N. Christiansen et al., pp. 57–67, Eurographics '81 (1981).

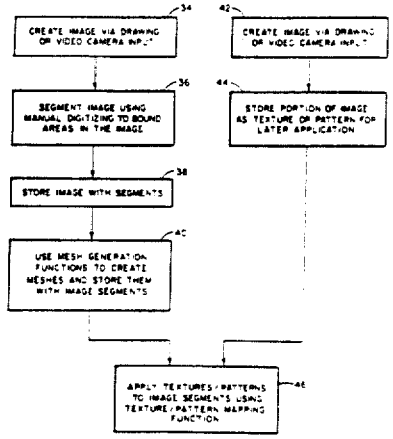

"Shiphulls, B-Spline Surfaces and CADCAM" by David F. Rogers et al., pp. 34-49, Frontiers in Computer Graphics—Proceedings of Computer Graphics Tokyo '84 (1985).

*Primary Examiner*—Thomas C. Lee

[57] ABSTRACT

A system and method for providing surface detail to computer generated two-dimensional graphic images of apparel or other free-form surfaces such that the three-dimensional appearance of the image is provided or enhanced. That is accomplished through a combination of user-controlled mesh generation for providing the topology of the image "surface" and a texture-mapping technique for applying the surface detail once the mesh has been generated. The system and method of the present invention may be used as one function of a larger two-dimensional computer aided design system for apparel, footwear, textiles, interior design, or other applications where the user may wish to add surface detail to a two-dimensional computer image of a three-dimensional object or surface.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 4–8, 22, 23 and 26 are cancelled.

Claims 1-3, 9, 17, 20, 21, 24, 25 and 27 are determined to be patentable as amended.

Claims 10-16, 18 and 19, dependent on an amended claim, are determined to be patentable.

New claims 28 and 29 are added and determined to be patentable.

1. In a computer-assisted design system, a method for providing surface detail to computer generated two-dimensional graphic images of three-dimensional surfaces to create a three-dimensional appearance comprising:

[generating a perspective mesh on said computer-generated two-dimensional graphic image such that said mesh creates a three-dimensional visual appearance;
mapping surface detail to said mesh point-by-point such that said surface detail produces a three-dimensional appearance; and
producing a graphic visual image of said two-dimensional graphic image with said surface detail applied.]

*producing a two-dimensional image of a three-dimensional object in a digital form for storage and processing by a digital computer;*

*dividing said two-dimensional image into segments, each segment representing a portion of said three-dimensional object;*

*generating at least one mesh within each segment wherein said at least one mesh creates a three-dimensional visual appearance, wherein said step of generating at least one mesh comprises:*

*entering geometric information into said computer for determining the shape of the mesh that is to be associated with said segment; and*

*calculating a two-dimensional perspective mesh based on said geometric information which perspective mesh is represented internal to said computer as two-dimensional data defining a plurality of horizontal and vertical lines spatially arranged to form a plurality of quadrilaterals representing a three-dimensional surface for each said segment, as such three-dimensional surface would appear to the eye, in two-dimensional form;*

*producing at least one image of surface detail in digital form for storage and processing by a digital computer;*

*mapping said surface detail to said mesh within each said segment such that said surface detail produces a three-dimensional appearance; and*

*producing a graphic visual image of said two-dimensional image covered by said surface detail wherein said image presents a three-dimensional appearance.*

2. A method for providing surface detail to computer-generated two-dimensional graphic images as set forth in claim 1, wherein the step of [generating a perspective mesh comprises:] dividing said two-dimensional image into segments [, each segment representing a portion of said three-dimensional object;] *comprises* circumscribing each of said segments by *one or more* polygons [; and calculating a perspective mesh for each segment circumscribed by each said polygon, said perspective meshes each comprising a plurality of horizontal and vertical lines spatially arranged to form a plurality of quadrilaterals representing the three-dimensional surface forms for said three-dimensional object].

3. A method for providing surface detail to computer-generated two-dimensional graphic images as in claim 1, *wherein the surface detail comprises an array of pixels and* wherein said step of mapping comprises:

a. scan-converting each quadrilateral within said mesh;

b. calculating a surface detail coordinate for each pixel lying within each segment based on the location of the pixel in the quadrilateral and on the location of the quadrilateral in the mesh;

c. mapping the surface detail coordinates to the array of [pixel] *pixels* making up the [selected] surface detail and selecting [the appropriate] *a* pixel *of the surface detail;* d. repeating steps a–c for every pixel in the quadrilateral scan line, and for every scan line in the quadrilateral, and for every quadrilateral in the mesh.

9. [A method for providing surface detail to computer-generated two-dimensional graphic images as set forth in claim 4] *In a computer-assisted design system, a method for providing surface detail to computer-generated two-dimensional graphic images of three-dimensional surfaces to create a three-dimensional appearance comprising:*

*a. producing a two-dimensional image of a three-dimensional object in a digital form for storage and processing by a digital computer;*

*b. dividing said two-dimensional image into segments, each segment representing a portion of said three-dimensional object;*

*c. circumscribing said segments by polygons in digital form for storage and processing by said digital computer;*

*d. generating at least one mesh within each segment wherein said at least one mesh creates a three-dimensional visual appearance, wherein said step of generating at least one mesh comprises:* displaying at least one of said segments bounded by said polygon on a graphic visual input/output device;

entering information into said computer for creating a series of bounding polylines which enclose each said segment; and calculating a perspective mesh contained by said bounding polylines which perspective mesh consists of a plurality of horizontal and vertical lines spatially arranged to form a plurality of quadrilaterals representing a three-dimensional surface for each said segment, as such three-dimensional surface would appear to the eye, in two-dimensional form [.];

e. *storing said segments with said meshes separate from said two-dimensional image in a data storage unit;* f. *producing at least one image of surface detail in the form of a rectangular array of pixels for storage and processing by a digital computer;* g. *storing said surface detail images in said data storage unit;* h. *mapping said surface detail to said mesh within each said segment such that said surface detail produces a three-dimensional appearance; and* i. *producing a graphical visual image of said two-dimensional image covered by said surface detail wherein said image presents a three-dimensional appearance.*

17. A method for providing surface detail to computer-generated two-dimensional graphic images as set forth in claim 9 *wherein the surface detail is defined at least in part by color and intensity attributes and* wherein said step of producing at least one image of surface detail comprises:

entering at least one image of at least one surface detail feature into the computer in such form as to permit display on a graphic visual input/output device; and storing at least a portion of said surface detail image in a data storage device through storing [the information necessary to define] the color and intensity attributes of each elemental point on the graphic input/output device displaying said image[, such information thus defining] *so as to define* a rectangular array of pixels representing the surface detail.

20. A method for providing surface detail to computer-generated two-dimensional graphic images as set forth in claim 17 *wherein the surface detail comprises an array of pixels and* wherein said step of mapping comprises:

A. selecting a segment of the two-dimensional image to which surface detail is to be applied;

B. selecting the surface detail to be applied;

C. retrieving the selected segment and mesh from data storage;

D. retrieving the selected surface detail from data storage;

E. scan-converting the x, y points forming the boundary of the selected segment by creating and storing a list of scan lines contained within the selected segment;

F. examining each quadrilateral within said mesh to determine whether any part of said quadrilateral lies within the bounding polylines of the selected segment; scan-converting each quadrilateral in said mesh, wherein at least a portion of said quadrilateral lies within the bounding polyline of the selected segment, by converting and temporarily storing a list of scan lines for each quadrilateral;

H. examining each scan-line from step g. on a pixel-by-pixel basis to determine those pixels lying within the selected segment;

I. calculating a surface detail coordinate for each pixel lying within the selected segment based on the location of the pixel in the quadrilateral and on the location of the quadrilateral in the mesh;

J. mapping the surface detail coordinates back to the array of pixels making up the selected surface detail and selecting the [appropriate] *a* pixel *of the surface detail;*

K. blending the surface detail pixel color and the pixel color at this position in the mesh;

L. repeating steps e–k for every pixel in the quadrilateral scan line, for every scan line in the quadrilateral, and for every quadrilateral in the mesh.

21. [a] *A* system for providing surface detail to computer-generated two-dimensional graphic images in a computer-assisted design system of three-dimensional free-form surfaces to create a three-dimensional appearance comprising:

[means for producing a two-dimensional image of a three-dimensional object in a form for storage and processing by a digital computer;

means for dividing said two-dimensional image into segments, each segment representing a portion of said object;

means for circumscribing said segments by polygons in digital form for storage and processing by a digital computer;

means for generating at least one mesh within each segment wherein said at least one mesh creates a three-dimensional visual appearance;

means for producing at least one image of surface detail in the form of a rectangular array of pixels for storage and processing by a digital computer;

means for storing said surface detail image in a data storage unit accessable by said digital computer;

means for mapping said surface detail to said mesh within said segment such that said surface detail produces a three-dimensional appearance; and means for creating a graphic visual image of said two-dimensional image, covered by said surface detail, giving a three-dimensional appearance.]

*means for producing a two-dimensional image of a three-dimensional object in a digital form for storage and processing by a digital computer;*

*means for dividing said two-dimensional image into segments, each segment representing a portion of said three-dimensional object;*

*means for generating at least one mesh within each segment wherein said at least one mesh creates a three-dimensional visual appearance, wherein said means for generating at least one mesh comprises:*

*means for entering geometric information into said computer for determining the shape of the mesh that is to be associated with said segment; and*

*means for calculating a two-dimensional perspective mesh based on said geometric information which perspective mesh is represented internal to said computer as two-dimensional data defining a plurality of horizontal and vertical lines spatially arranged to form a plurality of quadrilaterals representing a three-dimensional surface for each said segment, as such three-dimensional surface would appear to the eye, in two-dimensional form;*

*means for producing at least one image of surface detail in digital form for storage and processing by a digital computer;*

*means for mapping said surface detail to said mesh within each said segment such that said surface detail produces a three-dimensional appearance; and*

*means for producing a graphic visual image of said two-dimensional image covered by said surface detail wherein said image presents a three-dimensional appearance.*

24. A system for providing surface detail as set forth in claim 21 wherein said means for [circumscribing said segments] *dividing said two-dimensional image into segments* comprises:

means for displaying said two-dimensional image on a graphic visual input/output device;

means for circumscribing each of said segments by one or more polygons; and, means for entering information into said computer representing polygons formed around each segment as displayed on said graphic visual input/output device.

25. [A system for providing surface detail as set forth in claim 21] *A system for providing surface detail to computer-generated two-dimensional graphic images in a computer-assisted design system of three-dimensional free-form surfaces to create a three-dimensional appearance comprising:*

*means for producing a two-dimensional image of a three-dimensional object in a form for storage and processing by a digital computer;*

*means for dividing said two-dimensional image into segments, each segment representing a portion of said object;*

*means for circumscribing said segments by polygons in digital form for storage and processing by a digital computer;* means for generating at least one mesh within each segment wherein said at least one mesh creates a three-dimensional visual appearance, wherein said means for generating at least one mesh comprises:

means for displaying at least one of said segments bounded by said polygon on a graphic visual input/output device;

means for entering information into the computer for creating a series of bounding polylines which enclose said segment; and means for calculating a perspective mesh contained by said bounding polylines perspective which mesh consists of a plurality of horizontal and vertical lines spatially arranged to form a plurality of quadrilaterals representing a three-dimensional surface for said segment, as such surface would appear to the eye, in two-dimensional form[.]*;*

*means for producing at least one image of surface detail in the form of a rectangular array of pixels for storage and processing by a digital computer;*

*means for storing said surface detail image separate from said segments and said at least one mesh in a data storage unit accessible by said digital computer;*

*means for mapping said surface detail to said mesh within said segment such that said surface detail produces a three-dimensional appearance; and*

*means for creating a graphic visual image of said two-dimensional image, covered by said surface detail, giving a three-dimensional appearance.*

27. [A system for providing surface detail as set forth in claim 21] *A system for providing surface detail to computer-generated two-dimensional graphic images in a computer-assisted design system of three-dimensional free-form surfaces to create a three-dimensional appearance comprising:*

*means for producing a two-dimensional image of a three-dimensional object in a form for storage and processing by a digital computer;*

*means for dividing said two-dimensional image into segments, each segment representing a portion of said object;*

*means for circumscribing said segments by polygons in digital form for storage and processing by a digital computer;*

*means for generating at least one mesh within each segment wherein said at least one mesh creates a three-dimensional visual appearance;*

*means for producing at least one image of surface detail in the form of a rectangular array of pixels for storage and processing by a digital computer;*

*means for storing said surface detail image separate from said segments and said at least one mesh in a data storage unit accessible by said digital computer;*

*means for mapping said surface detail to said mesh within said segment such that said surface detail produces a three-dimensional appearance,* wherein said means for mapping comprises:

means for selecting a segment of the two-dimensional image to which said surface detail is to be applied;

means for selecting the surface detail to be applied;

means for retrieving the selected segment and mesh from data storage;

means for retrieving the selected surface detail from data storage;

means for scan-converting the x, y points forming the boundary of the selected segment by creating and storing a list of scan lines contained within the selected segment;

means for examining each quadrilateral in said mesh to determine whether any part of said quadrilateral lies within the bounding polylines of the selected segment;

means for scan-converting each quadrilateral in said mesh and temporarily storing a list of scan-lines for each quadrilateral;

means for examining each scan-line on a pixel-by-pixel basis to determine those pixels lying within the selected segment;

means for calculating a surface detail coordinate for each pixel lying within the selected segment based on the location of the pixel and the quadrilateral and on the location of the quadrilateral in the mesh;

means for mapping the surface detail coordinates back to the array of pixels making up the selected surface detail and means for selecting the appropriate pixel;

means for blending the surface detail pixel color and the pixel color at this position in the mesh[.]*; and*

*means for creating a graphic visual image of said two-dimensional image, covered by said surface detail, giving a three-dimensional appearance.*

28. A method for providing surface detail to computer-generated two dimensional graphic images as set forth in claim 1, wherein said step of entering geometric information comprises creating bounding polylines which enclose one or more of said segments.

29. A system for providing surface detail as set forth in claim 21, wherein said means for entering geometric information comprises means for creating bounding polylines which enclose one or more of said segments.

* * * * *